United States Patent [19]

Ferrara

[11] Patent Number: 4,759,934

[45] Date of Patent: Jul. 26, 1988

[54] PROCESS FOR PREPARING HIGH PROTEIN BREAD WITH ASCORBIC ACID AND PRODUCT

[76] Inventor: Peter J. Ferrara, Ridge Rd., P.O. Box 441, Cornwall, N.Y. 12518

[21] Appl. No.: 930,256

[22] Filed: Nov. 13, 1986

Related U.S. Application Data

[63] Continuation-in-part of Ser. No. 778,887, Sep. 23, 1985, abandoned.

[51] Int. Cl.[4] .................. A21D 2/22; A21D 13/06
[52] U.S. Cl. .................................. 426/21; 423/23; 423/25; 423/549
[58] Field of Search .................. 426/25, 23, 21, 549

[56] References Cited

U.S. PATENT DOCUMENTS

| | | | |
|---|---|---|---|
| 2,149,682 | 3/1939 | Jorgensen | 426/25 |
| 3,006,765 | 10/1961 | Ferrari | 426/23 |
| 3,304,183 | 2/1967 | Johnston et al. | 426/25 |
| 3,519,441 | 7/1970 | Ferrara | 426/455 |
| 3,803,326 | 4/1974 | Craig et al. | 426/25 X |
| 3,934,040 | 1/1976 | Smerak et al. | 426/23 X |
| 3,959,496 | 5/1976 | Jackel et al. | 426/25 |
| 3,987,206 | 10/1976 | Titcomb et al. | 426/23 X |
| 4,145,225 | 3/1979 | Ferrara | 106/154.1 |

FOREIGN PATENT DOCUMENTS 649795  10/1962  Canada .................. 426/25

OTHER PUBLICATIONS

Jorgensen, H., (1935, Biochem Z CCLXXI).
Hale, W. S. et al., (1939, Cereal Chem XVI, 605).

*Primary Examiner*—Joseph Golian

[57] ABSTRACT

A technique for producing baked products, such as bread with very high protein levels, up to about 45% on a dry basis (18 to 25% on a wet basis), by incorporating in the unrisen dough the desired high protein levels, large amounts of ascorbic acid, e.g. 450 to 850 PPM and small amounts of potassium bromate; and steam treating the full fat wheat germ and soy flakes to remove sulfhydril as measured by the absence of glutathione; and then rising and baking to produce a product of good taste, shelf life and density comparable to what would have been produced in the absence of the high protein levels.

9 Claims, No Drawings

PROCESS FOR PREPARING HIGH PROTEIN BREAD WITH ASCORBIC ACID AND PRODUCT

This application is a continuation-in-part of application Ser. No. 778,887 filed Sept. 23, 1985, now abandoned, the entire contents of which are incorporated herein by reference.

This invention relates to the processing of ingredients useful for baked goods. Among these are wheat germ, soybean flours and dry inactive food yeasts. These and similar foods processed by means of this invention may be incorporated with vital wheat gluten and wheat flours to produce yeast leavened breads.

This invention has the further objective of using the processed ingredients in conventional bakery equipment to achieve high levels of protein, up to 20–25% protein by weight in the bread as baked, compared to 8% protein for standard white loaf.

One of the elements which governs the processing of the ingredients prior to the sequence of formation, mixing, fermentation and baking of the breads is covered by an issued U.S. Pat. No. 3,519,441 (FERRARA AND SNODGRASS) dated July 7, 1979, with the title: PROCESS FOR TREATING FLOUR AND STARCH TO ELIMINATE FREE SH GROUPS. Within this broad heading, the process includes treating full fat natural wheat germ, wheat flours and soybean flours to satisfy three conditions. First, the thermal (by steaming) destruction and elimination of micro-organisms. To the extent that certain criteria are met, this style of heat treatment enables the production of weevil-free storageability without chemicals, plus extended shelf-life. Secondly, the thermal treatment by steaming at moderate pressures is continued beyond the requirement of eliminating microbial contamination, to the point where the products so treated are substantially free of enzymatic activity including the thermal resistant enzymes classed as oxidases. Thirdly, the processing is further extended to eliminate free SH groups either as glutathione or cysteine. These are known to have strong reducing properties with marked effects on the protein gluten structure in yeast leavened breads.

In the case of processing wheat germ to the extent where free SH groups are eliminated, at least to the point of being non-detectable by known nitroprusside test procedures, the germ so treated was found to have a pleasing toasted flavor with exceptional storage stable properties, without requiring refrigeration or vacuum packing.

A completely unexpected feature arising from the elimination of SH groups is wheat germ which was neither appreciated nor understood at the time the hereinabove patent issued is the discovery that when SH free processed wheat germ is ground to a fine flour in the range of 24–30 mesh size, U.S.S., its stability is greatly increased. The wheat germ flour is not only storage stable relative to the formation of free fatty acids, but the flavor is well maintained for periods of 6 months. This phenomenon while not understood may be, explained in "theory". The grinding of the processed wheat germ flakes probably exposes more of its naturally occurring anti-oxidant, somewhat similar to that which has been isolated and identified in processed oats.

Free SH groups in natural full-fat wheat germ are generally present in an amount to make bread bakers hesitant to use wheat germ in amounts to exceed 1% to 2%, though the standards for "enriched bread" permit the usage of wheat germ up to 5% of the flour ingredient. Instead, bakers interested in using wheat germ for enriched or specialty breads are limited to modest amounts of solvent extracted or defatted wheat germ. These are essentially oil-free and seem easier to deal with in baking breads.

Having cited the steam processing which eliminates the action of free SH groups inherent in wheat germ, the further objectives which follow are more readily appreciated. One of these objectives is to incorporate steam processed full-fat wheat germ in yeast leavened breads at levels high enough to impart flavor, nutrition and desired values in terms of protein level.

Another objective of this invention is to incorporate steam treated full-fat soybean flours in conjunction with the processed wheat germ.

Another objective of this invention is to produce yeast leavened breads supplementing the protein content of commercial wheat flours with vital wheat gluten so as to produce loaves having good crumb texture and oven spring with bread densities in the range of 440–520 ml. per 100 grams of bread.

These and other objectives will be apparent from the disclosures and examples cited herein.

For a long time, bakers have sought different ways of applying increased energy or work to yeasted doughs with the idea of shortening or eliminating the standard techniques of bulk fermentation. This interest was accompanied with research on the functionality of dough improvers and conditioners, some to strengthen gluten and others to achieve mellowing or softening to match the changes taking place in dough fermentation. There was general agreement that dough improvers acted upon the SH linkages in wheat flours. The literature on "dough improver" research is extensive, going back to H. JORGENSEN (1935 BIOCHEM Z CCLXXI) and the research of W. S. HALE and associates (1939 CEREAL CHEM. XVI, 605).

JORGENSON obtained a U.S. Pat. No. 2,149,682, covering the use of ascorbic acid in amounts up to 50 PPM as a flour and bread improver in conventional dough processes. The early work revealed that the improving effects of ascorbic acid, like that of potassium bromate, resulted in fimer grain and greater loaf volume. Later, there was general agreement the oxidative effect of ascorbic acid is the consequence of enzymatic oxidative action which transformed the ascorbic acid into dehydroascorbic, the oxidized form of ascorbic acid.

Today, there is a greater understanding of the mechanics enabling ascorbic acid to function as a dough improver. During dough fermentations the oxidative improvers are acting on the protein components which include glutathione (SH) or other reducing agents in flour. These reducing substances have the capability of activating proteinases which in turn serve to mellow or soften gluten just as if this was accomplished through increased energy input.

This theory of proteinase activation by reducing agents was in part, the basis for our U.S. Pat. No. 4,145,225 (FERRARA) issued Mar. 20, 1979, titled: METHOD OF MODIFYING THE PROPERTIES OF CEREAL FLOURS AND THE MODIFIED FLOURS SO PRODUCED. In this invention, hydrogen cyanide (HCN) is employed as a reducing agent acting on wheat flours. The surprising development is that a proteolytic enzyme system subjected to treatment with cyanide is so strongly activated by HCN that it brings about the devitalization of the wheat gluten, and the substantial destruction of other enzymes like amylases and even oxidases. How this is achieved may not be understood, though it becomes evident the destruction of the flour enzymes achieves the same high paste viscosity characteristics as have steam treated flours. From this result one can conclude that an activated proteinase apparently cannot distinguish between the molecular structure of gluten proteins, and those of enzymes.

In 1953, Wallace and Tiernan Co. introduced the DO-MAKER PROCESS. In this process a liquified sponge was processed continuously with a charge of yeast and nutrients to a "developer" tank where the fermentation process interval was reduced to a short time. The key to the process was the use of a reducing agent, cysteine, which was known to act on the proteins in wheat flour. Shortly thereafter, the American Machine and Foundry (subsequently known as AMF) introduced another version of the continuous bread making process under the name "AM-FLOW". Both the DO-MAKER and AM-FLOW processes required special equipment for pumping fluid doughs, storages and holding vessels, as well as instruments to contend with the addition of yeast nutrients and for PH control. To get around these complexities, scientists and bakers in the U.K. collaborated in the development of the CHORLEYWOOD PROCESS, using more conventional bakery equipment. The original U.K. process relied on a combination of ascorbic acid at 75 PPM and poassium bromate at 20 PPM. By the time the U.K. process was developed there was an appreciation that ascorbic acid, known as a reducing agent, was also capable of assuming the dehydroascorbic state, the oxidized form.

A U.S. Pat. No. 3,304,183, issued Feb. 14, 1967 to William R. Johnston and Robert E. Mauseth, applied some of the previous research to a continuous bread process. The Patent is titled: ASCORBIC ACID AND AN OXIDIZING AGENT IN CONTINUOUS BREAD PROCESS. The principal objectives sought were directed at lowering the mixing speed requirements by means of including 10 to 200 PPM of ascorbic acid in a variety of flour mixtures; to the fermentation broth; and/or the oxidant solution. In a continuous dough process about 10 PPM appeared to be inadequate, in most instances. (Column 2, lines 59–64 of the Patent). Some varieties of flour required higher ascorbic acid levels to reduce the mixing requirement. Thus, Colume 3, lines 70–72, stipulate; "It is desired that 10–120 PPM of ascorbic are used and preferably 20–80 PPM".

The foregoing commercial practices developed rapidly up to a certain point and then slowed because the bread crumb had such a fine uniform grain that the breads looked artificial and were generally "suspect" among buyers of bread. In any case, these developments brought new focus on how wheat flour proteins were affected by combinations of reducing agents and oxidizing improvers. More and more, flour millers and bakers moved the bread making processes in the direction of achieving the equivalent of high energy input into doughs, in shorter intervals and lower mixing requirements.

Referring again to our Pat. No. 3,519,441, Column 4, lines 1–38, we theorize that glutathione, which can exist both as the reduced form GSH, and the oxidized form G-S-S-G, may in fact serve as key elements in the rapid development of gluten in wheat flours. Part of the problem in supplementing "in situ" glutathione for the rapid development of dough, is centered on the problem in assessing the quantity "in situ". Thus, if one were to establish the total of glutathione useful in a bread making process, in terms of GSH, one would then be faced with the problem of identifying the supplement to the "in situ" version. For this reason, the focus of the invention insofar as our use of wheat germ is concerned, is among other features, the complete elimination of glutathione, either of GSH or G-S-S-G. Having achieved this, one is then free to manipulate the addition of improvers independent from the amount of GSH or G-S-S-G in the original sources.

The reason for directing attention to both GSH and G-S-S-G is based on observations that G-S-S-G, the oxidized form of glutathione, when present, is a constant source of GSH. While this phenomenon has been accorded token recognition by investigators, we have found it is equally important to check for GSH as well as G-S-S-G. The presence of GSH by use of the well known nitroprusside test procedures fall short of identifying G-S-S-G. To check for G-S-S-G, one must moisten the sample to be examined with a solution of NaCN (sodium cyanide) which is subsequently acidified to generate HCN, enough to reduce the G-S-S-G to GSH. The test sample is then checked for GSH in the usual way.

From tests conducted in the process of steaming wheat germ, we theorized that the steaming process not only transforms the G-S-S-G to GSH, but a portion of the G-S-S-G undergoes "thermal cracking" or "hydrolytic scission", converting the tripeptide into its three amino acids; glycine, glutamic and cysteine. The cysteine is further transformed from RSH to RSR, the usual way of expressing cystine; the stabilized counterpart of cysteine. Whether or not the process follows the sequence as outlined the evidence suggesting the simultaneous break-down of G-S-S-G and GSH is supported by application of the nitroprusside tests in the manner described hereinabove.

The foregoing background is presented to clarify the mechanics of the instant invention. As previously set forth, in subjecting doughs to greater inputs of energy the main focus was on fast acting oxidants and reducing agents. The possibility of using slow acting improvers in large amounts received less consideration due to regulatory restraints imposed by governmental bodies. For example, even in the case of the ascorbic acid (VITAMIN C) its utility as a dough improver did not exceed the 80 PPM reported in the first CHORLEYWOOD PROCESS. In most bread making processes where dough improver uses of ascorbic are reported, the usage is mainly in the range of 30–80 PPM. Relative to usage of ascorbic acid primarily to reduce dough mixing speed requirements, Johnston et. al. U.S. Pat. No. 3,304,183, column 5, lines 35–39 recites that, "50 PPM is optimum if the baker finds a reasonable bread score is necessary". This statement in the specification is greatly expanded to a claimed range of ascorbic acid of 10 PPM to 400 PPM on a flour basis (see claims 8 and 10).

This invention comprises an improvement in the art of producing baked, yeast leavened cereal products such as bread whereby increased amounts of protein are incorporated without adversely affecting physical and flavor properties. This is accomplished by utilizing large amounts of ascorbic acid in the bread formation.

The additional inclusion of potassium bromate in the bread formation has proved to be helpful. Ascorbic acid can be used in a proportion of at least about 450 PPM. No particular advantage has been observed when more than about 850 PPM ascorbic acid has been used. The potassium bromate is a useful bread dough improver when used in a proportion of at least about 30 PPM, along with ascorbic acid. These proportions are on the basis of weight percentage of the ingredients.

In the course of our research on bread baking we found it was difficult to produce breads of good quality even if the glutathione free processed wheat germ was used at low levels of 5 to 10% of the bread ingredients. This disappointment persisted even with the use of 200 PPM of ascorbic acid and 50 PPM of potassium bromate, with supplementation vital wheat gluten at levels equal to the baking flour. It was only when we decided to depart from the conventional usage levels of ascorbic acid and potassium bromate that the loaf volume and texture characteristics showed real improvement. When the level of ascorbic acid was increased to 450 PPM and amounts greater than this, improvement of bread quality was evidenced by greater oven spring and loaf volume. The addition of potassium bromate at levels of 30-50 PPM contributed to further improvements. These experiments with steam processed wheat germ and soybean flours revealed a whole new area of quality baking performance if the ascorbic acid was used in the range of 450 PPM to 850 PPM, and still further when potassium bromate supplementation was held in the range of 30-50 PPM.

Before setting forth an example typical for this invention, it may be useful to review some of the ascorbic acid forms sold commercially, and which are used herein. Ascorbic acid is marketed as a fine granular powder or crystal, both in a pure state assaying above 99%. When used in baking a bread mixture of freshly prepared ingredients, the pure powder or crystal may preferrably be used. If the bread ingredients are blended and stored for future use, the ascorbic acid used is preferrably one coated with a water soluble material like ethyl cellulose. The coating prevents contact of the ascorbic acid with reactive ingredients likely to reduce its effectiveness. The coated grades with ethyl cellulose assay a minimum of 97.5% ascorbic acid. The dough improvement action of the ascorbic acid is initiated immediately when water is added to the ingredients since the water dissolves off this coating.

Ascorbic acid is also commercially available with water insoluble fatty coatings having high melting points so the release of the ascorbic acid is delayed until well into the oven baking step. (See Jackel U.S. Pat. No. 3,959,496, the encapsulation process licensed to Balchem Corporation of Slate Hill, N.Y. Also review sales literature of Balchem offering ascorbic acid with a 50% added fatty coating.)

The four main ingredients in the high protein bread are a bakery grade bakery flour, vital wheat gluten, wheat germ, and a soybean flour or concentrate. The bakery flour is an enriched grade with minimum 13% protein. The wheat gluten is preferrably a high quality vital gluten with about 75% protein and water absorption in the range of 130-140%. The wheat germ is preferrably freshly milled full fat natural germ with oil content between about 9-12%, and protein in the range of about 26-29%. The wheat germ is conventionally processed with steam in accordance with the techniques described in Ferrara Pat. No. 3,519,441, to eliminate free SH so substantially none is evidenced by nitroprusside tests. Then the germ is ground to a fine meal, suitably about 30 MESH (USS screen).

The soybean flour is obtained in one of several ways: soybean grits or flakes made from de-hulled beansmay be treated with steam in the same manner as that applied to wheat germ. These grits or flakes assay about 20% oil and about 42-44% protein. Alternatively, one may use defatted soya flour containing less than about 1% oil, with protein levels around 58-60%. The considerable research over the past 50 years directed at improving the flavor of soya flour products, has resulted in novel soya protein concentrates. Generally the concentrate, the end product of removing oil plus water soluble non-protein components, will assay about 68-70% protein (N×6.25). The concentrate is often preferred because such use greatly diminishes the risk of "rope spore" development, especially in breads.

The ingredients cited herein above are used to make high protein breads in the range of 18-25% protein, based on the weight of the bread; with moisture in the bread about 38-42%. The table following deals with a typical ingredient mix for a sponge-dough bread approximating 20% protein. By shifting the percentages, including the supplementation with dried food grade yeasts and sources of vegetable fiber, the final protein level in the bread can be adjusted to suit marketing aspects.

| | TYPICAL BREAD INGREDIENT SCHEDULE (100 POUNDS) | | | | |
|---|---|---|---|---|---|
| | | | | Distribution of Ingredient Pounds | |
| | Amount In | Percent | Weight of | | |
| Ingredient | Pounds | Protein | Protein | Sponge | Dough |
| Wheat Germ | 20 | 27 | 5.40 | 12 | 8 |
| Soya Concentrate | 8 | 66 | 5.28 | 5 | 3 |
| Wheat Gluten | 22 | 75 | 16.50 | 22 | 0 |
| Wheat Flour | 50 | 13 | 6.50 | 30 | 20 |
| Totals | 100 | | 33.68 | 69 | 31 |

Protein in Bread = 33.68 × 60% = 20.2%

The Sponge

The above ingredients for the sponge are placed in a mixer. In addition, 0.20 lbs. ammonium chloride, 0.40 lbs. calcium hydrogen phosphate, 17.5 grams ascorbic acid and 6.6 grams of potassium bromate are added. The ingredients are mixed. 2 lbs. of active compressed yeast are mixed with 60 lbs. of water adjusted to 82° F. Yeast solution is added to the sponge and mixed until smooth and elastic (about 6-8 minutes). Target temperature 82°-84° F. When the sponge has at least doubled original volume (60-70 minutes) it is ready for dough ingredients.

The Dough

The dough ingredients are mixed with 2-4 ounces of calcium proprionate and 8.7 grams of ascorbic acid. 2-4 lbs. sugar are dissolved in 23 lbs. water at 80° F. The dry ingredients are added to the sponge. Sugar-water solution is then added. When well mixed (2 minutes), 1-1.25 lbs. of salt are added and mixing continued for a total of 4-5 minutes (approximately one-half sponge mix time). The dough is allowed to rest for about 5 minutes.

Baking

After the dough rest period, it is scaled and rounded and then shaped for depositing in pan. Proof until dough reaches desired level in pan (40-60 minutes). Bake at 385° F.–410° F. for 28 to 35 minutes.

This formulation is predicated on using ascorbic acid at 570 PPM combined for sponge and dough, and potassium bromate on sponge side at 30 PPM. Optimum baking is obtained apportioning the total ascorbic acid so that 60-80% is added via the sponge and the balance to the dough. This technique of handling the ascorbic acid results in better dough handling characteristics, greater oven spring, nicer crumb texture and less tendency for side-walls to collapse. The overall water absorption in the range of 83-85%, and the water retention ability of the wheat gluten dictate a longer drying (baking) interval, at least 30-40% longer than the ordinary breads of commerce.

In many test bakes, the total amount of ascorbic acid has been varied from 200 PPM to 850 PPM. To produce loaf volumes in the ranges of 440-520 ml. per 100 grams, the amount of ascorbic acid should be at least about 450 PPM, and need not be more than about 850 PPM. Ascorbic acid can disappear by two routes. One, it is known to undergo attrition by the natural pathways associated with Vitamin C. Obviously, its useful function as an oxidative substance in doughs, is simultaneously with another action. Somehow, these two avenues are difficult to separate. When better understood, it will then be possible to account for the improved baking which results when ascorbic acid is used at both the sponge and dough stages.

The quantity of potassium bromate when used in the range of 30-50 PPM suggests that its contribution may primarily be as a "trigger" for the ascorbic acid.

We have described as the invention the production of yeast leavened breads, using steam processed wheat germ free of detectable SH, along with a soya product useful for baking, plus vital wheat gluten and a bakery flour; said bread when baked is a bold loaf with 18-25% protein. Provisions being made for the incorporation of ascorbic acid in both sponge and dough, in a total amount equivalent to 450-850 PPM based on the combined ingredients. In addition thereto, potassium bromate is used at 30-50 PPM in the sponge. The bread so baked is of good volume, it may be sliced and wrapped, with shelf life equivalent to the usual breads of commerce.

What is claimed is:

1. A process for producing a yeast leavened wheat bread comprising forming a dough comprising half baking flour, vital wheat gluten, steam treated full fat wheat germ having substantially no glutathione, and soy concentrate sufficient to provide a final baked bread containing about 18 to 25% protein; about 450 to 850 ppm ascorbic acid; about 5 to 10%, based on said ascorbic acid, potassium bromate; and water; and fermenting and baking said dough.

2. The improved process claimed in claim 1 including adding at least about 30 PPM potassium bromate.

3. The improved process of claim 1 wherein said potassium bromate is in proportion of about 30 to 50 PPM based on said dough.

4. A process as claimed in claim 1 wherein said dough contains 20 weight % wheat germ, 8 weight % soya concentrate and 22 weight % wheat gluten.

5. A process as claimed in claim 1 including separately preparing sponge and dough compositions each comprising the same ingredients, mixing the sponge and the dough, and then baking the mixture.

6. A process as claimed in claim 1 wherein soy flakes steamed to substantially eliminate sulfhydril therefrom comprises said soy concentrate.

7. The process as claimed in claim 1 wherein said ascorbic acid is coated with a water soluble material and dry mixed with the separate sponge and dough ingredients.

8. The bread product of the process of claim 1.

9. The bread product of the process of claim 5.

* * * * *